(12) United States Patent
Blundell et al.

(10) Patent No.: US 8,392,694 B2
(45) Date of Patent: Mar. 5, 2013

(54) SYSTEM AND METHOD FOR SOFTWARE INITIATED CHECKPOINT OPERATIONS

(75) Inventors: Colin B. Blundell, West Allenhurst, NJ (US); Harold Wade Cain, III, Yorktown Heights, NY (US); Gheorghe C. Cascaval, Carmel, NY (US); Maged Milad Michael, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 834 days.

(21) Appl. No.: 12/559,643

(22) Filed: Sep. 15, 2009

(65) Prior Publication Data

US 2011/0066831 A1    Mar. 17, 2011

(51) Int. Cl.
*G06F 7/38* (2006.01)
*G06F 9/00* (2006.01)
*G06F 9/44* (2006.01)
*G06F 15/00* (2006.01)

(52) U.S. Cl. ....................................................... 712/228
(58) Field of Classification Search ................... 712/228
See application file for complete search history.

(56) References Cited

U.S. PATENT DOCUMENTS

| 5,832,205 | A | * | 11/1998 | Kelly et al. | ............... | 714/53 |
| 8,078,854 | B2 | * | 12/2011 | Vick et al. | ............... | 712/244 |
| 2010/0153776 | A1 | * | 6/2010 | Vick et al. | ............... | 714/15 |

* cited by examiner

*Primary Examiner* — Corey S Faherty
(74) *Attorney, Agent, or Firm* — Yudell Isidore Ng Russell PLLC

(57) ABSTRACT

A method, system and computer program product for issuing one or more software initiated operations for creating a checkpoint of a register file and memory, and for restoring a register file and memory to the checkpointed state. At the execution of a checkpoint operation, the system returns a condition code indicating success or failure. When the condition code is set equal to one, one or more checkpoints are initiated. Contents of the register file and gated store buffer are stored each time the one or more checkpoints are initiated. When the checkpoint is created, the system notifies software when a hardware checkpoint capacity has been reached. One or more of the software checkpoint, hardware checkpoint, and handler checkpoint are utilized to provide a more precise point of restoration. During software execution, the register file and gated store buffer can be restored as defined by the one or more previous checkpoints.

20 Claims, 5 Drawing Sheets

SYSTEM AND METHOD FOR SOFTWARE INITIATED CHECKPOINT OPERATIONS

BACKGROUND

1. Technical Field

The present invention generally relates to computer systems and in particular to checkpoint operations within computer systems.

2. Description of the Related Art

Checkpoint operations enable a computer to backtrack to a previously acceptable machine state. As an alternative to completely restarting an execution, checkpoint operations provide a point whereby implementation of a process may be resumed when a fault occurs during execution. Existing forms of checkpoint operations enable saving the checkpoint state of a machine in a fault-tolerant memory as changes are made to the main memory between checkpoints. Each time a memory location is written, select contents of the main memory are recorded in a first in first out (FIFO) buffer. If a fault occurs, the state of the memory at the end of the last checkpoint cycle can be reconstructed by reading the FIFO and rewriting the main memory from the contents thereof.

Although the concept of checkpoint operations for a processor state has existed for some time in support of fault tolerance, the methods are not efficient. Recent work in speculative software optimizations, such as transactional memory, has motivated support for more efficient software-initiated generation of checkpoint operations. The optimal design of a checkpoint operation depends on the length of execution that must be supported by the checkpoint operation. For short execution lengths, pure-hardware checkpoint operations are feasible, which are already used for conditional branch speculation, dependence speculation, and fault tolerance. However, if longer execution lengths are to be supported by the checkpoint/recovery operations, a pure-hardware checkpoint operation provides insufficient capacity for buffering architectural states.

SUMMARY OF ILLUSTRATIVE EMBODIMENTS

Disclosed are a method, a system and a computer program product for issuing one or more software initiated operations for creating a checkpoint of a register file and memory, and for restoring a register file and memory to the checkpointed state. At the execution of a checkpoint operation, the system returns a condition code indicating success or failure. When the condition code is set equal to one, one or more checkpoints are initiated. Contents of the register file and gated store buffer are stored each time the one or more checkpoints are initiated. When the checkpoint is created, the system notifies software when a hardware checkpoint capacity has been reached. The notification is issued through condition code setting in response to resource allocation demands, or through exception handlers in response to asynchronous events. Previous checkpoint states are detected and stored, whereby the previous checkpoints are one or more of a software checkpoint, hardware checkpoint, and handler checkpoint. One or more of the software checkpoint, hardware checkpoint, and handler checkpoint are utilized to provide a more precise point of restoration. During software execution, the register file and gated store buffer can be restored as defined by the one or more previous checkpoints.

The above as well as additional objectives, features, and advantages of the present invention will become apparent in the following detailed written description.

BRIEF DESCRIPTION OF THE DRAWINGS

The invention itself, as well as advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
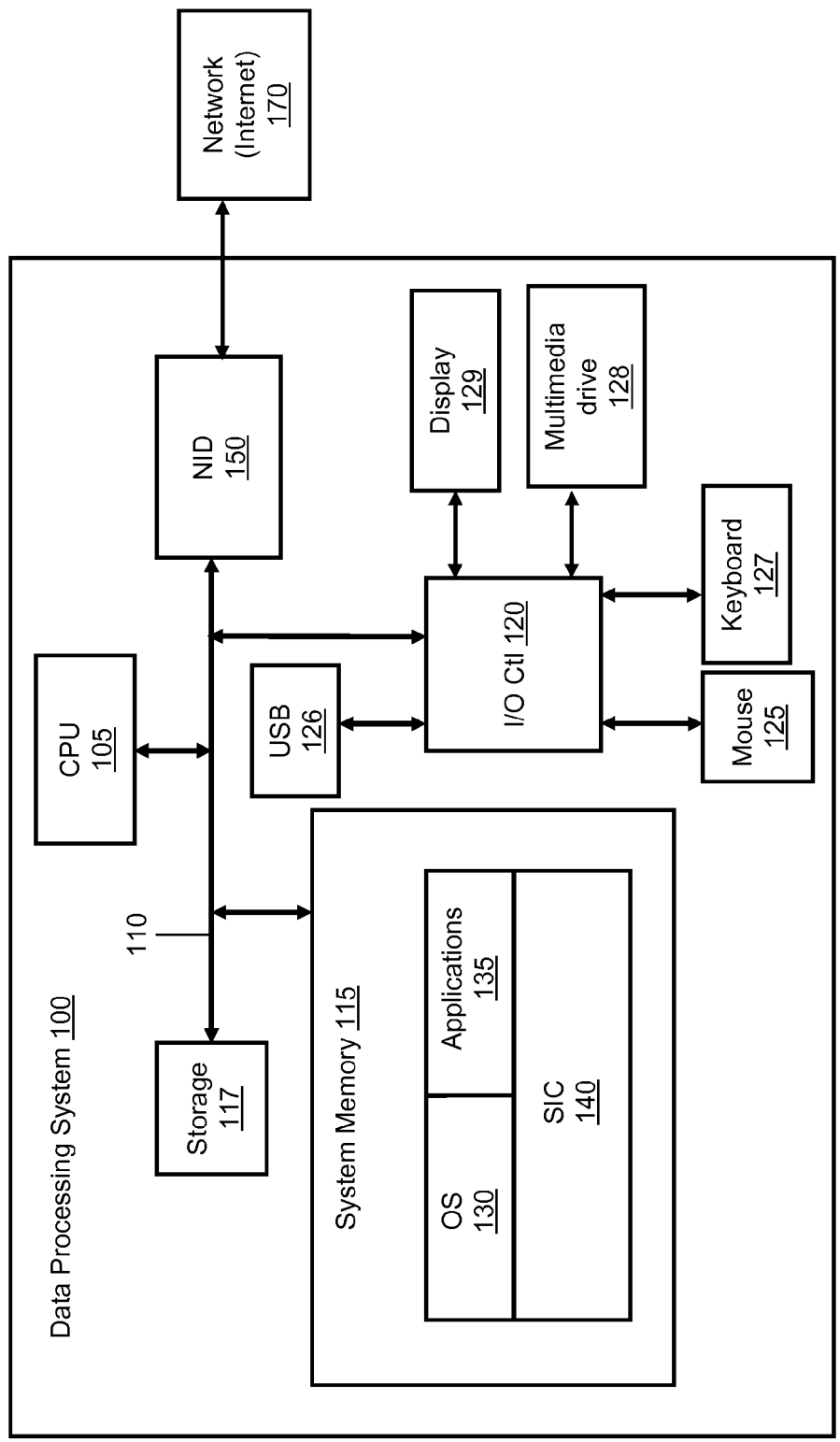
FIG. 1 provides a block diagram representation of an example data processing system within which the invention is practiced, according to one embodiment of the invention.

The illustrative embodiments provide a method, a system and a computer program product for issuing one or more software initiated operations for creating a checkpoint of a register file and memory, and for restoring a register file and memory to the checkpointed state. At the execution of a checkpoint operation, the system returns a condition code indicating success or failure. When the condition code is set equal to one, one or more checkpoints are initiated. Contents of the register file and gated store buffer are stored each time the one or more checkpoints are initiated. When the checkpoint is created, the system notifies software when a hardware checkpoint capacity has been reached. The notification is issued through a condition code setting in response to resource allocation demands, or through exception handlers in response to asynchronous events. Previous checkpoint states are detected and stored, whereby the previous checkpoints are one or more of a software checkpoint, hardware checkpoint, and handler checkpoint. One or more of the software checkpoint, hardware checkpoint, and handler checkpoint are utilized to provide a more precise point of restoration. During software execution, the register file and gated store buffer can be restored as defined by the one or more previous checkpoints.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically as described herein, checkpoint operation(s) is also expressed as checkpoint(s).

With reference now to the figures, and beginning with FIG. 1, there is depicted a block diagram representation of an example data processing system (DPS), as utilized within one embodiment. DPS may be a computer, a portable device, such as a personal digital assistant (PDA), a smart phone, and/or other types of electronic devices that may generally be considered processing devices. As illustrated, DPS 100 comprises at least one processor or central processing unit (CPU) 105 connected to system memory 115 via system interconnect/bus 110. Also connected to system bus 110 is input/output (I/O) controller 120, which provides connectivity and control for input devices, of which pointing device (or mouse) 125 and keyboard 127 are illustrated. I/O controller 120 also provides connectivity and control for output devices, of which display 129 is illustrated. Additionally, a multimedia drive 128 (e.g., compact disk read/write (CDRW) or digital video disk (DVD) drive) and USB (universal serial bus) port 126 are illustrated, coupled to I/O controller 120. Multimedia drive 128 and USB port 126 enable insertion of a removable storage device (e.g., optical disk or thumb drive) on which data/instructions/code may be stored and/or from which data/instructions/code may be retrieved. DPS 100 also comprises storage 117, within which data/instructions/code may also be stored.

DPS 100 is also illustrated with a network interface device (NID) 150, by which DPS 100 may connect to one or more access/external networks 170, of which the Internet is provided as one example. In this implementation, the Internet represents/is a worldwide collection of networks and gateways that utilize the Transmission Control Protocol/Internet Protocol (TCP/IP) suite of protocols to communicate with one another. NID 150 may be configured to operate via wired or wireless connection to an access point of the network. Network 170 may be an external network such as the Internet or wide area network (WAN), or an internal network such as an Ethernet (local area network—LAN) or a Virtual Private Network (VPN).

In addition to the above described hardware components of DPS 100, various features of the invention are completed via software (or firmware) code or logic stored within system memory 115 or other storage (e.g., storage 117) and executed by CPU 105. Thus, for example, illustrated within system memory 115 are a number of software/firmware/logic components, including operating system (OS) 130 (e.g., Microsoft Windows®, a trademark of Microsoft Corp, or GNU®/Linux®, registered trademarks of the Free Software Foundation and The Linux Mark Institute), applications 135, and software initiated checkpoint (SIC) utility 140 (which executes on CPU 105 to provide SIC logic). In one embodiment, SIC utility 140 may be a sub-component of OS 130 or may be an add-on to OS 130. For simplicity, SIC utility 140 is illustrated and described as a stand alone or separate software/firmware component, which provides specific functions, as described below.

CPU 105 executes SIC utility 140 as well as OS 130, which supports the user interface features of SIC utility 140. Certain functions supported and/or implemented by SIC utility generate processing logic executed by processor and/or device hardware to complete the implementation of that function. For simplicity of the description, the collective body of code that enables these various features is referred to herein as SIC utility 140. Among the software code/instructions/logic provided by SIC utility 140, and which are specific to the invention, are: (a) code/logic for detecting when one or more hardware resources are exhausted; (b) code/logic for initiating a software initiated checkpoint operation to generate a software initiated checkpoint; (c) code/logic for detecting, during the software initiated checkpoint operation, when a gated store buffer is full; and (d) when the gated store buffer is not full, storing the contents of one or more of a register file and a memory as the register state corresponding to the checkpoint operation to enable restoration to that checkpoint when a current register state is not a desired register state. According to the illustrative embodiment, when CPU 105 executes SIC utility 140, DPS 100 initiates a series of functional processes that enable the above functional features as well as additional features/functionality. These features/functionality are described in greater detail below within the description of FIGS. 2-5.

Those of ordinary skill in the art will appreciate that the hardware components and basic configuration depicted in FIG. 1 may vary. The illustrative components within DPS 100 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
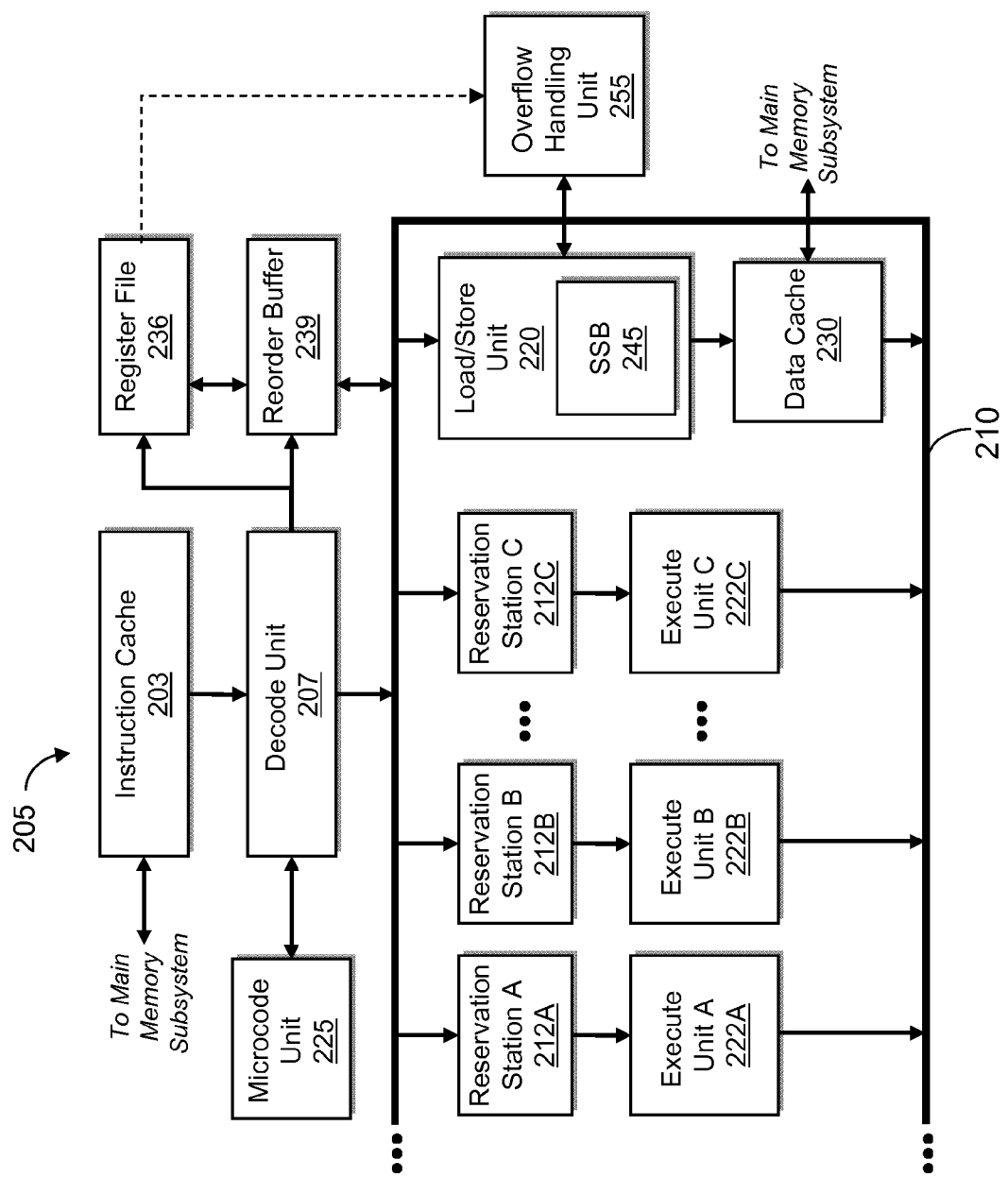
FIG. 2 is diagram illustrating a block diagram representation of a microprocessor within which the invention is practiced, according to one embodiment of the invention

With reference now to FIG. 2, which illustrates a block diagram representation of an example CPU, as utilized within one embodiment. CPU 205 includes instruction cache 203, data cache 230, decode unit 207, one or more reservation stations 212 A, 212 B, and 212 C, one or more execute units 222 A, 222 B, and 222 C, load/store unit 220, reorder buffer 239, register file 236, and microcode unit 215. Within load/store unit 220 is speculative store buffer 245. Signals and instruction are transmitted within CPU 205 via system bus 210. Overflow handling unit 255 communicates with register file 236 and load/store unit 220. Elements referred to herein with a particular reference number followed by a letter will be collectively referred to by the reference number alone. For example, the plurality of execute units will be collectively referred to herein as execute units 222.

In one embodiment, CPU 205 supports software initiated checkpoint operations. SIC utility (140, of FIG. 1) detects when a checkpoint has failed. When a failed checkpoint is detected, SIC utility initiates a software checkpoint for one or more architectural states.

In one embodiment, register file 236 comprises one or more physical registers and a register map. The register map maps an architectural register specifier to a physical register specifier. Checkpoints are utilized to mark software-based speculation regions of one or more software speculations. A checkpoint of the register map is generated at the initiation of a software speculation. SIC utility blocks the use of the physical register until the software speculation is determined to be correct. One or more architectural registers are written during the software-based speculation region. The length of the software speculation is constrained by the size of register file 236. A physical register exists that saves contents of an original register for the one or more architectural registers written during the software-based speculation region. SIC utility determines when to reclaim the checkpointed physical registers.

In another embodiment, SIC utility generates instructions to support best-effort checkpoint operations of register file 236. SIC utility initiates a first checkpoint. The software continuously executes, then returns to the register state of the first checkpoint when a switch instruction is detected. SIC utility automatically determines when the most current register state is the most efficient (desirable) register state. When a determination is made that the most recent register state is the most desirable, previously defined register checkpoints are discarded.

In one embodiment, a hardware checkpoint is initiated. When the hardware checkpoint is initiated, the set of register checkpoints becomes exhausted (or physical registers become exhausted). SIC utility enables a hardware mechanism to transmit control of the software buffers to overflow handling unit 255.

Figure 3:
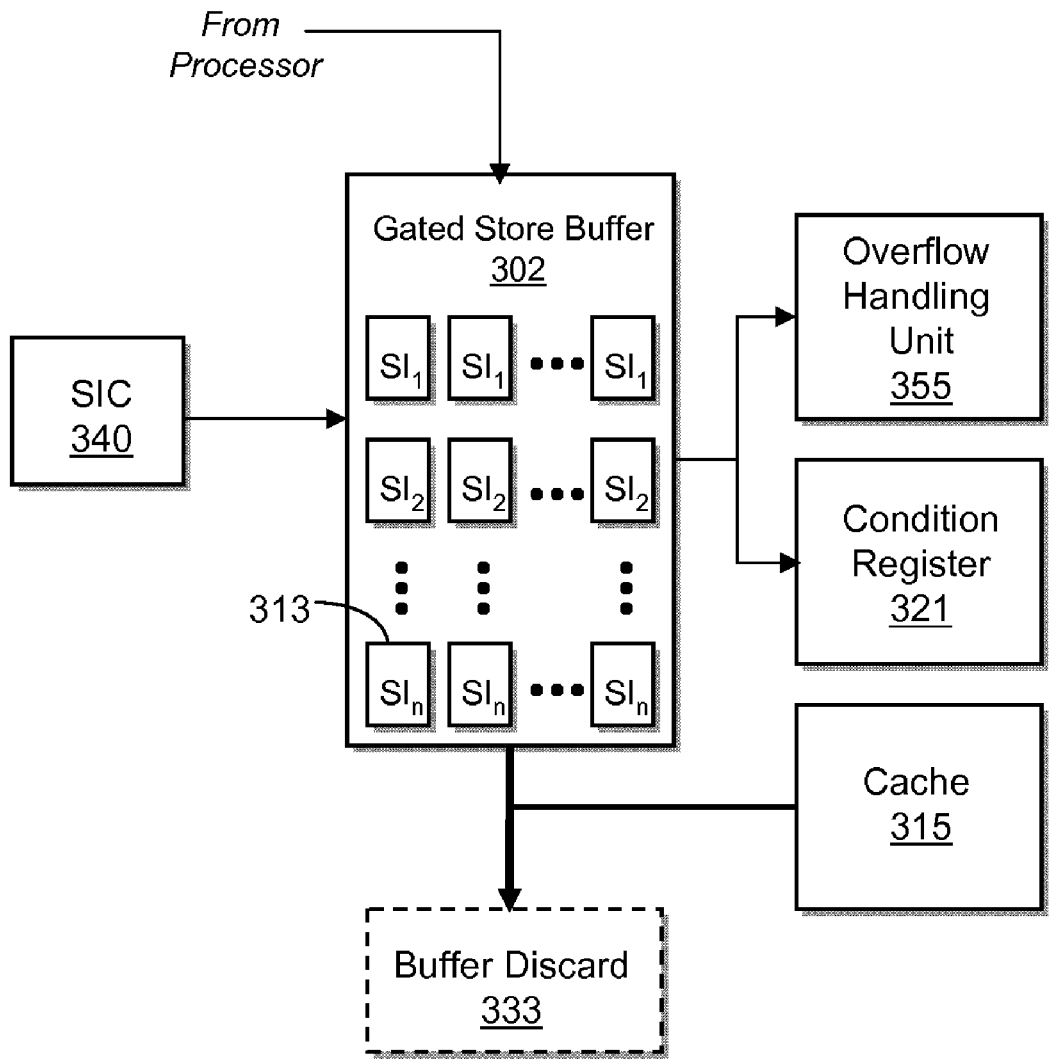
FIG. 3 is diagram illustrating a gated store buffer associated with an overflow handling unit and condition register, according to one embodiment of the invention.

FIG. 3 illustrates a gated store buffer associated with an overflow handling unit and condition register. Gated store buffer 302 includes one or more store instructions 313. Gated store buffer 302 communicates with overflow handling unit 355, condition register 321, cache 315, and buffer discard 333. SIC utility 340 controls one more activities of and/or on gated store buffer 302.

In one embodiment, the number of store instructions (313) executed between first checkpoint and the commit time exceeds the capacity of the gated store buffer (302). Store instructions 313 are the contents of gated store buffer 302. Store instructions 313 are transmitted to overflow handling unit 355, whereby overflow handling unit 340 initiates an overflow handling operation. The overflow handling operation transmits store instructions 313 to a predefined (user-defined) region of memory. In another embodiment, store instructions 313, of gated store buffer 302 are saved and restored via an operating system, such as OS 130, as instructed by SIC 340.

In another embodiment, when there are no empty entries within a gated store buffer (302) stores executed between first checkpoint and the commit time fail. Store instructions 313 returns a Boolean in condition register 321, whereby the Boolean indicates whether store instruction 313 has succeeded or failed to enter gated store buffer 302. When a failure is detected an alternative software buffering mechanism is utilized to maintain the checkpointed state.

In one embodiment, the gated store buffer (302) has available space at the initiation of a checkpoint. A software checkpoint is initiated. During software execution the space available within gated store buffer 302 becomes exhausted. SIC utility 340 detects a failed Boolean value when one or more store instructions attempt to enter the exhausted gated store buffer 302. SIC utility 340 initiates a checkpoint, via overflow handling unit 355, and resumes the software execution. Overflow handling unit 355 distributes a predefined handler checkpoint. The contents of a previous hardware checkpoint are received by the SIC utility. Hardware checkpoint conditions are utilized by SIC utility 340 to create a software checkpoint.

Figure 4:
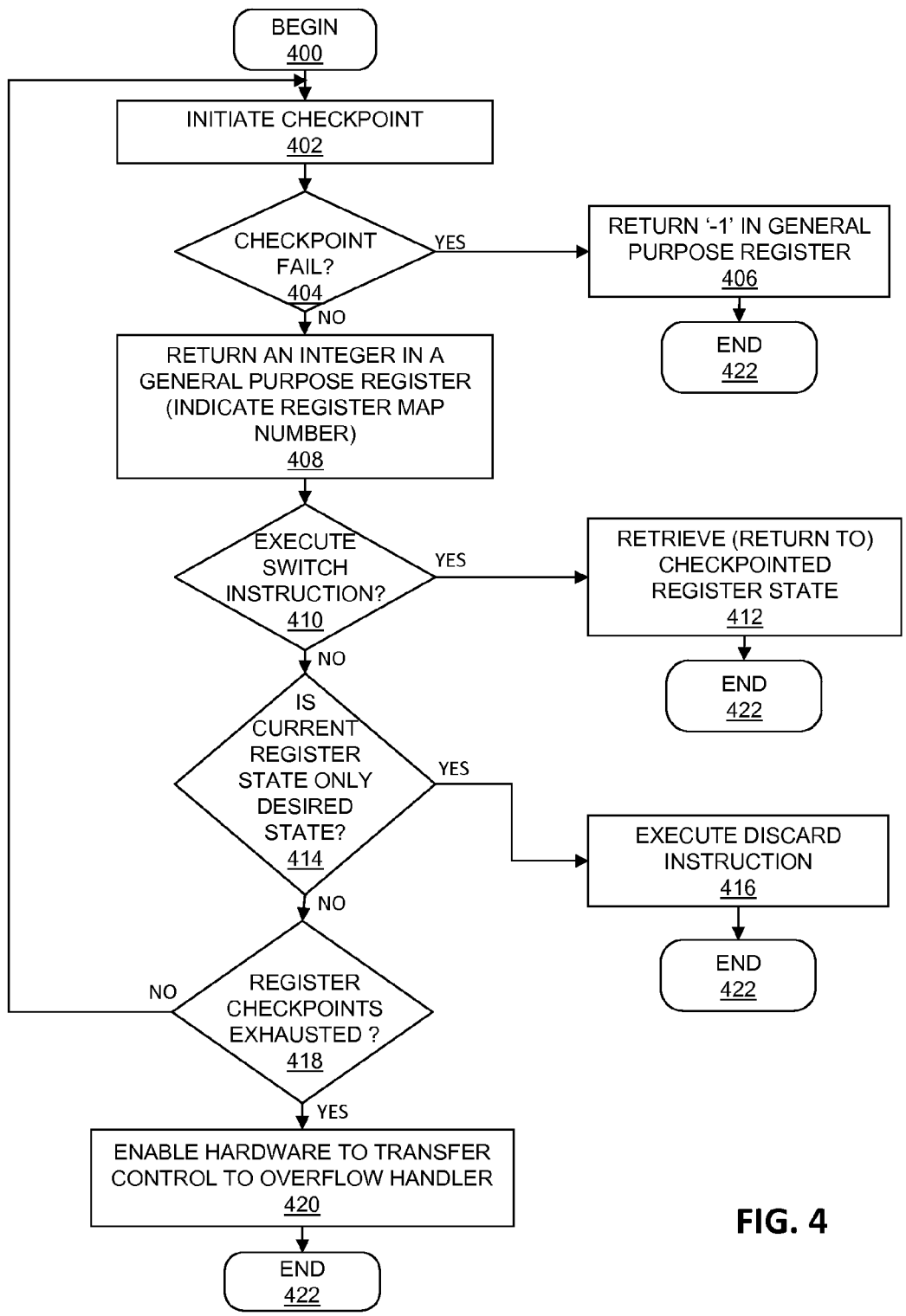
FIG. 4 is a flow chart illustrating the processes for checkpoint operations utilizing a register file, in accordance with one embodiment of the invention.
Figure 5:
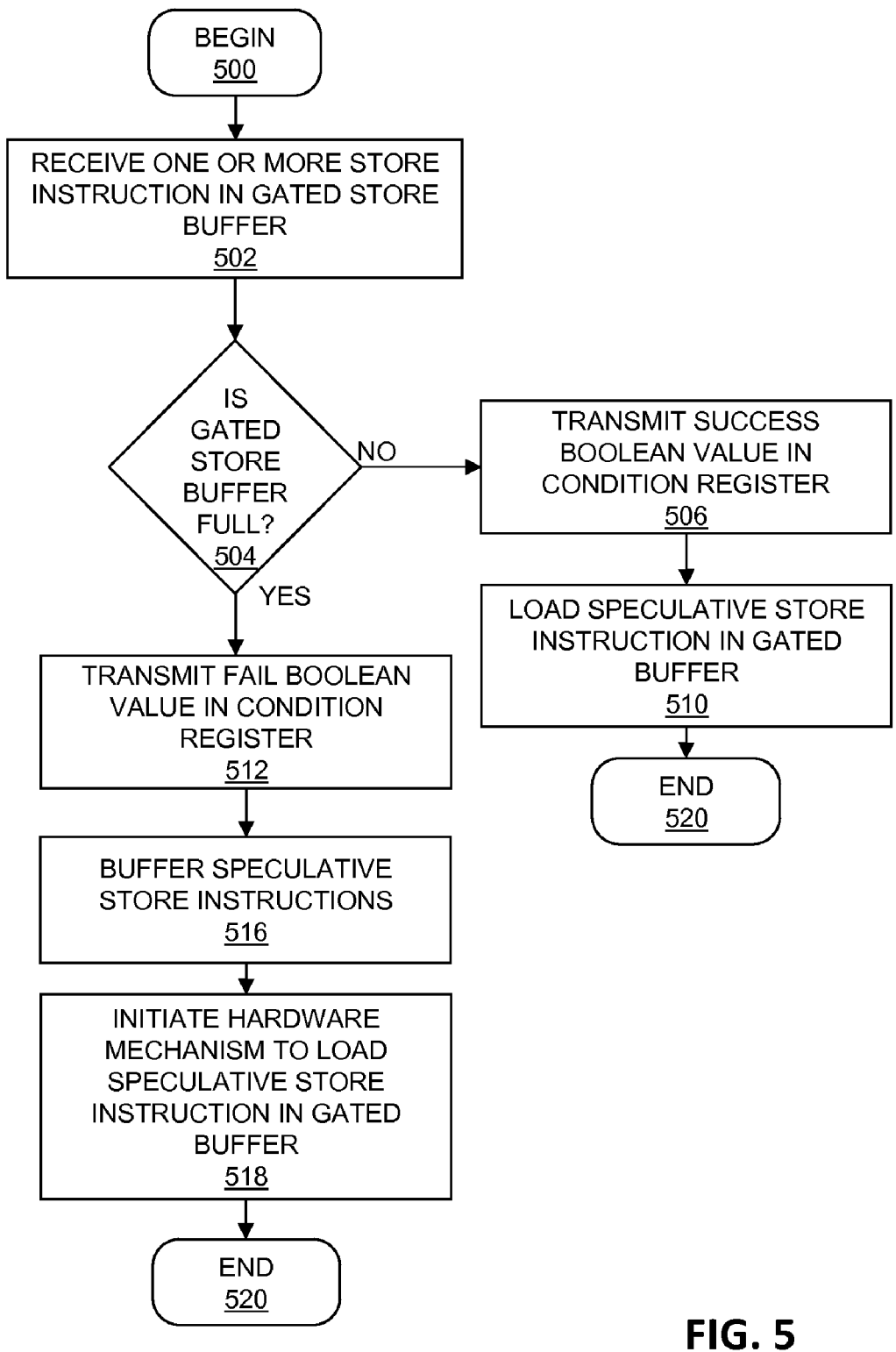
FIG. 5 is a flow chart illustrating the processes for checkpoint operations utilizing a gated store buffer, according to one embodiment of the invention.

FIGS. 4-5 are flow charts illustrating various methods by which the above processes of the illustrative embodiments are completed. Although the methods illustrated in FIGS. 4-5 may be described with reference to components shown in FIGS. 1-3, it should be understood that this is merely for convenience and alternative components and/or configurations thereof can be employed when implementing the various methods. Key portions of the methods may be completed by SIC utility 140 executing on processor 105 within DPS 100 (FIG. 1) and controlling specific operations on DPS 100, and the methods are thus described from the perspective of both DPS utility 140 and DPS 100.

FIG. 4 depicts the processes for initiating a checkpoint operation utilizing a register file. The process of FIG. 4 begins at initiator block 400 and proceeds to block 402, at which a checkpoint is initiated. A decision is made, at block 404, whether a checkpoint has failed. If the checkpoint has failed the process continues to block 406. At block 406 a '−1' (or a failure indicator) is returned in a general purpose register. If the checkpoint does not fail, the process continues to block 408. At block 408 an integer, which represents a pass indicator, is returned to the general purpose register. The integer returned indicates a register map number.

A decision is made, at block 410, whether to execute a switch instruction. If the switch instruction is executed at block 410 the process continues to block 412. At block 412 the contents of the checkpointed register state are retrieved (i.e. returned to checkpointed the register state). If switch instruction is not executed the process continues to block 414. A decision is made, at block 414, whether the current register state is the only desired state. If the current register state is the desired state the process continues to block 416. At block 416 a discard instruction is executed, whereby other register checkpoints are discarded.

A decision is made, at block 418, whether the register checkpoints are exhausted. If the register checkpoints are not exhausted the process continues to block 402. If the register checkpoints are exhausted the process continues to block 420. At block 420 the utility enables hardware to dynamically transfer control of the checkpoints to the overflow handler. The process ends at block 422.

The processes for checkpoint operations utilizing a gated store buffer are depicted in FIG. 5. The process of FIG. 5 begins at initiator block 500 and proceeds to block 502, at which one or more store instructions are received in a gated store buffer. A determination is made, at block 504, whether the gated buffer is full. If the gated buffer is not full the process continues to block 506. At block 506 a "success" Boolean value is transmitted to the condition register. One or more speculative store instructions are loaded at block 510. If the gated buffer is full the process continues to block 512. At block 512 a "fail" Boolean value is transmitted to the condition register. The speculative store instructions are buffered at block 516. At block 518 a hardware mechanism for loading the speculative store instructions into the gated store buffer is initiated. The process ends at block 520.

In the flow charts above, one or more of the methods are embodied in a computer readable storage medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, system, and/or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," "logic", or "system." Furthermore, the present invention may take the form of a computer program product on a computer-usable storage medium having computer-usable program code embodied in or on the medium.

As will be further appreciated, the processes in embodiments of the present invention may be implemented using any combination of software, firmware, microcode, or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The medium may be electronic, magnetic, optical, electromagnetic, infrared, or semiconductor system (or apparatus or device) or a propagation medium. Further, the medium may be any apparatus that may contain, store, communicate, propagate, or transport the program for use by or in connection with the execution system, apparatus, or device. The methods of the invention may be practiced by combining one or more machine-readable storage devices containing the code according to the described embodiment(s) with appropriate processing hardware to execute the code contained therein. An apparatus for practicing the invention could be one or more processing devices and storage systems containing or having network access (via servers) to program(s) coded in accordance with the invention. In general, the term computer, computer system, or data processing system can be broadly defined to encompass any device having a processor (or processing unit) which executes instructions/code from a memory medium.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for providing a software initiated checkpoint operation that reports and responds to a failure of a hardware checkpoint, said method comprising:
   processor logic detecting when one or more hardware resources are exhausted;
   initiating the software initiated checkpoint operation to generate a software initiated checkpoint;
   detecting, during the software initiated checkpoint operation, when a gated store buffer is full, which indicates that the checkpoint operation has failed; and
   in response to the gated store buffer not being full, storing the contents of one or more of a register file and a memory as the register state corresponding to the software-initiated checkpoint to enable restoration to that checkpoint when a current register state is not a desired register state.

2. The method of claim 1, further comprising:
   detecting a register state during storing of the contents of the one or more of the register file and the memory;
   determining when the current register state is the desired register state;
   restoring the register file and the memory to a previous register state defined by a previous checkpoint, in response to the current register state not being the desired register state; and
   in response to the current register state being the desired register state, discarding the previous checkpoint.

3. The method of claim 1, further comprising:
   returning an integer in a general purpose register when the checkpoint has not failed, wherein the integer indicates a register map number; and
   in response to the checkpoint failing, returning a fail indicator in the general purpose register.

4. The method of claim 1, further comprising:
   in response to the gated store buffer not being full, transmitting a success Boolean value to a condition register; and
   transmitting a fail Boolean value to the condition register in response to the gated store buffer being full.

5. The method of claim 4, further comprising: in response to the success Boolean value being received at the condition register, loading one or more stores into the gated buffer, wherein the one or more stores are speculative stores.

6. The method of claim 1, further comprising:
   receiving one or more stores at the gated store buffer;
   detecting a number of stores received between when the checkpoint is initiated and a commit time;
   in response to the gated store buffer not containing empty entries, returning a failure indicator to a condition register when one or more additional stores are received; and in response to the number of stores received between initiation of the checkpoint and the commit time exceeding the capacity of the gated store buffer, executing a handler operation, wherein the handler operation transmits contents of the gated store buffer to a predefined memory location.

7. The method of claim 1, further comprising:
detecting one or more hardware initiated checkpoints;
retrieving contents of the register file and memory stored during the one or more hardware initiated checkpoints; and
associating the one or more hardware initiated checkpoints with the software initiated checkpoint, wherein the association enables restoration of the register file and memory to a previous register state defined by the one or more hardware initiated checkpoints.

8. A data processing system comprising:
a processor component; and
logic associated with the processor component that provides a software initiated checkpoint operation, which reports and responds to a failure of a hardware checkpoint, said logic including logic for:
detecting when one or more hardware resources are exhausted;
initiating the software initiated checkpoint operation to generate a software initiated checkpoint;
detecting, during the software initiated checkpoint operation, when a gated store buffer is full, which indicates that the checkpoint operation has failed; and
in response to the gated store buffer not being full, storing the contents of one or more of a register file and a memory as the register state corresponding to the checkpoint to enable restoration to that checkpoint when a current register state is not a desired register state.

9. The computer system of claim 8, further comprising logic for:
detecting a register state during storing of the content of the one or more of the register file and the memory;
determining when the current register state is the desired register state;
restoring the register file and the memory to a previous register state defined by a previous checkpoint, when the current register state is not the desired register state; and
in response to the current register state being the desired register state, discarding the previous checkpoint.

10. The computer system of claim 8, further comprising logic for:
returning an integer in a general purpose register when the checkpoint has not failed, wherein the integer indicates a register map number; and
in response to the checkpoint failing, returning a fail indicator in the general purpose register.

11. The computer system of claim 8, further comprising logic for:
in response to the gated store buffer not being full, transmitting a success Boolean value to a condition register; and
transmitting a fail Boolean value to the condition register in response to the gated store buffer being full.

12. The computer system of claim 11, further comprising logic for:
in response to the success Boolean value being received at the condition register, loading one or more stores into the gated buffer, wherein the one or more stores are speculative stores.

13. The computer system of claim 8, further comprising logic for:
receiving one or more stores at the gated store buffer;
detecting a number of stores received between when the checkpoint is initiated and a commit time;
in response to the gated store buffer not containing empty entries, returning a failure indicator to a condition register when one or more additional stores are received; and
in response to the number of stores received between initiation of the checkpoint and the commit time exceeding the capacity of the gated store buffer, executing a handler operation, wherein the handler operation transmits contents of the gated store buffer to a predefined memory location.

14. The computer system of claim 8, further comprising logic for:
detecting one or more hardware initiated checkpoints;
retrieving contents of the register file and memory stored during the one or more hardware initiated checkpoints; and
associating the one or more hardware initiated checkpoints with the software initiated checkpoint, wherein the association enables restoration of the register file and memory to a previous register state defined by the one or more hardware initiated checkpoints.

15. A computer program product comprising:
a computer readable medium; and
program code on the computer readable medium that when executed by a processor provides the functions of:
detecting when one or more hardware resources are exhausted;
initiating a software initiated checkpoint operation to generate a software initiated checkpoint;
detecting, during the software initiated checkpoint operation, when a gated store buffer is full, which indicates that the checkpoint operation has failed; and
in response to the gated store buffer not being full, storing the contents of one or more of a register file and a memory as the register state corresponding to the checkpoint to enable restoration to that checkpoint when a current register state is not a desired register state.

16. The computer program product of claim 15, further comprising program code for:
detecting a register state during storing of the contents of the one or more of the register file and the memory;
determining when the current register state is the desired register state;
restoring the register file and the memory to a previous register state defined by a previous checkpoint, when the current register state is not the desired register state; and
in response to the current register state being the desired register state, discarding the previous checkpoint.

17. The computer program product of claim 15, further comprising program code for:
returning an integer in a general purpose register when the checkpoint has not failed, wherein the integer indicates a register map number; and
in response to the checkpoint failing, returning a fail indicator in the general purpose register.

18. The computer program product of claim 15, further comprising program code for:
in response to the gated store buffer not being full, transmitting a success Boolean value to a condition register;
transmitting a fail Boolean value to the condition register when the gated store buffer is full; and in response to receiving the success Boolean value at the condition register, loading one or more stores into the gated buffer, wherein the one or more stores are speculative stores.

19. The computer program product of claim 15, further comprising program code for:
receiving one or more stores at the gated store buffer;
detecting a number of stores received between when the checkpoint is initiated and a commit time;
in response to the gated store buffer not containing empty entries, returning a failure indicator to a condition register when one or more additional stores are received; and
in response to the number of stores received between initiation of the checkpoint and the commit time exceeding the capacity of the gated store buffer, executing a handler operation, wherein the handler operation transmits contents of the gated store buffer to a predefined memory location.

20. The computer program product of claim 15, further comprising program code for:
detecting one or more hardware initiated checkpoints;
retrieving contents of the register file and memory stored during the one or more hardware initiated checkpoints; and
associating the one or more hardware initiated checkpoints with the software initiated checkpoint, wherein the association enables restoration of the register file and memory to a previous register state defined by the one or more hardware initiated checkpoints.

* * * * *